US008576857B2

(12) United States Patent
Singh et al.

(10) Patent No.: US 8,576,857 B2
(45) Date of Patent: Nov. 5, 2013

(54) AUTOMATICALLY IDENTIFYING AN EDGE-FACING ROUTER

(75) Inventors: Hemant Singh, Westford, MA (US); William Beebee, Jr., Lowell, MA (US); Ralph Droms, Westford, MA (US); Ole Troan, Bergen (NO)

(73) Assignee: Cisco Technology, Inc., San Jose, CA (US)

(*) Notice: Subject to any disclaimer, the term of this patent is extended or adjusted under 35 U.S.C. 154(b) by 503 days.

(21) Appl. No.: 12/692,367

(22) Filed: Jan. 22, 2010

(65) Prior Publication Data
US 2011/0182295 A1 Jul. 28, 2011

(51) Int. Cl.
H04L 12/56 (2011.01)

(52) U.S. Cl.
USPC .......................................... 370/401

(58) Field of Classification Search
USPC .......................................... 370/401
See application file for complete search history.

(56) References Cited

U.S. PATENT DOCUMENTS

| | | | | |
|---|---|---|---|---|
| 2002/0194362 A1* | 12/2002 | Rawlins et al. | ............ | 709/235 |
| 2003/0018715 A1* | 1/2003 | O'Neill | ............ | 709/204 |
| 2006/0140164 A1* | 6/2006 | Patel et al. | ............ | 370/338 |
| 2006/0159100 A1 | 7/2006 | Droms et al. | | |
| 2007/0171873 A1* | 7/2007 | Nam et al. | ............ | 370/331 |
| 2008/0008104 A1* | 1/2008 | Previdi et al. | ............ | 370/255 |
| 2008/0049717 A1* | 2/2008 | Jamieson et al. | ............ | 370/351 |
| 2008/0084866 A1* | 4/2008 | Johnson et al. | ............ | 370/351 |
| 2008/0259925 A1* | 10/2008 | Droms et al. | ............ | 370/392 |
| 2009/0041058 A1* | 2/2009 | Ikeda et al. | ............ | 370/475 |
| 2010/0118728 A1* | 5/2010 | Prudent | ............ | 370/252 |
| 2011/0103344 A1* | 5/2011 | Gundavelli et al. | ............ | 370/331 |
| 2011/0317711 A1* | 12/2011 | Droms et al. | ............ | 370/401 |
| 2012/0036268 A1* | 2/2012 | Choo et al. | ............ | 709/226 |

FOREIGN PATENT DOCUMENTS

CN 101485160 A 7/2009
WO WO 2008/131371 A2 10/2008

OTHER PUBLICATIONS

European Search Report dated Mar. 22, 2011 (9 pages).
European Current Claims dated Mar. 2011 (7 pages).
Baker, F., "Prefix Sub-delegation in a SOHO/SMB Environment draft-baker-ipv6-prefix-subdelegation-00" downloaded from the Internet on Mar. 11, 2010 < http://tools.ietf.org/html/draft-baker-ipv6-prefix-subdelegation-00 > 10 pages.

(Continued)

Primary Examiner — Mark Rinehart
Assistant Examiner — Christopher R Crompton
(74) Attorney, Agent, or Firm — Hickman Palermo Truong Becker Bingham Wong LLP; Daniel D. Ledesma

(57) ABSTRACT

Techniques for automatically identifying an edge-facing router in a network are provided. In one technique, data is obtained at a first router of a subscriber network. The data may be included in a DHCP message or a NDP RA message. The first router determines, based on the data, whether the first router is a service provider (SP)-facing router, which is a router that is coupled to a SP router and no other router in the subscriber network is logically between the SP-facing router and the SP router. If it is determined that the first router is an SP-facing router, then the first router stores identification data that identifies the first router as an SP-facing router. Otherwise, the first router stores identification data that identifies the first router as a non-SP-facing router.

25 Claims, 5 Drawing Sheets

(56) References Cited

OTHER PUBLICATIONS

Singh, H. et al., "IPv6 CPE Router Recommendations draft-ietf-v6ops-ipv6-cpe-router-01" downloaded from the Internet on Mar. 11, 2010 < http://tools.ietf.org/id/draft-ietf-v6ops-ipv6-cpe-router-01.txt > 19 pages.

Chinese Office Action received in International Application No. 201010611952.9 dated May 30, 2013 (16 pages).

Chinese Current Claims in International Application No. 201010611952.9 dated May 2013 (6 pages).

* cited by examiner

Fig. 5B

512 Router receives Neighbor Discovery Protocol (NDP) Router Advertisement (RA) packet

↓

514 Inspect particular RA option field value containing a delegated prefix value

↓

516 Is delegated prefix less than /64

— NO → Return

— YES ↓

308 Set flag indicating this router is an SP-facing router

↓

510 Sub-delegate /64 prefixes to other routers in the home network or perform other responsive actions

↓

Return

Fig. 5A

502 CPE router receives DHCPv6 response message from a prefix delegating router (e.g., SP router)

↓

504 Inspect delegated prefix

↓

506 Is delegated prefix less than /64

— NO → Return

— YES ↓

308 Set flag indicating this router is an SP-facing router

↓

510 Sub-delegate /64 prefixes to other routers in the home network or perform other responsive actions

↓

Return

AUTOMATICALLY IDENTIFYING AN EDGE-FACING ROUTER

TECHNICAL FIELD

The present disclosure generally relates to automatically configuring routers in networks such as in subscriber-routed networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

As Internet Protocol version 4 (IPv4) address space nears exhaustion, stand-alone retail home routers will increasingly use IP version 6 (IPv6). Use of NAT (network address translation) in IPv6 is discouraged. As a result, consensus is growing within the IETF (Internet Engineering Task Force) to use dynamic host configuration protocol version 6 (DHCPv6) prefix delegation in home networks to assign prefixes to subnets instead of NAT, which was used for IPv4. If a home network has more than one router, which is a common deployment scenario, then prefix sub-delegation will be used for IPv6.

One example of a home network with more than one router is a network with (1) a cable modem that includes an embedded router and (2) a retail stand-alone router logically "behind" the embedded router. The embedded router typically does not serve as a wireless access point, while the retail stand-alone router typically does serve as a wireless access point. Because the retail stand-alone router is expected to work without configuration, prefix sub-delegation must be automated.

Use of /64 prefixes is desirable in a home network as this enables the use of Stateless Address Auto Configuration (SLAAC, defined in RFC 48622) for automatically configuring IPv6 addresses of hosts on the subnet. For example, a network Service Provider (SP) delegates a /60 prefix (or any prefix shorter than /64) to an SP-facing home router. The SP-facing router could automatically sub-delegate the prefix through hierarchical sub-delegation. Hierarchical sub-delegation involves an SP-facing router splitting the address based on the number of LAN subnets (to which the SP-facing router is connected) rounded up to the nearest power of 2. "Downstream" routers (or routers that are "behind" the SP-facing router relative to the SP network) can utilize the same mechanism, and all subnets in the home network will be addressed. However, at least two problems arise as a result.

First, address space is not conserved, as not all /64 subnets which are possible from the /60 delegated by the SP are used. Second, hierarchical sub-delegation does not work in arbitrarily routed graph networks because hierarchical sub-delegation "assumes" that the topology of the home network is a tree. The topology of a network refers to the arrangement of the routers in the network. If the topology of a home network is a tree, then there are no cycles in the topology of the home network.

BRIEF DESCRIPTION OF THE DRAWINGS

In the drawings:

FIG. 5A depicts a process of determining whether a router is an SP-facing router;

FIG. 5B depicts a process of determining whether a router is an SP-facing router when a discovery protocol option value includes a delegated prefix;

DESCRIPTION OF EXAMPLE EMBODIMENTS

Figure 1:
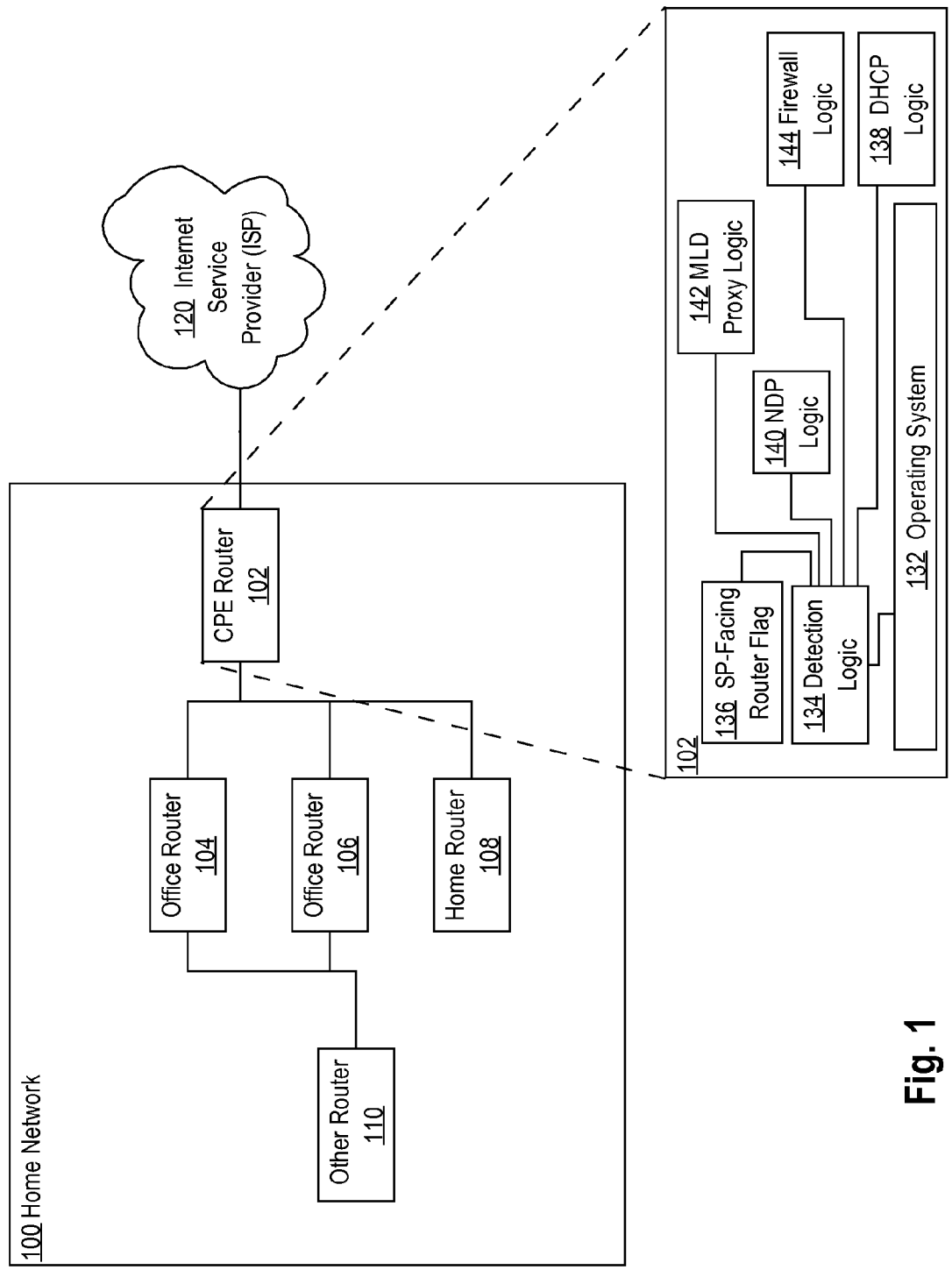
FIG. 1 depicts an example home network that is connected to a single Internet Service Provider (ISP)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

References herein to "home network" include any SOHO/SMB network. SOHO is an acronym for "Small Office, Home Office" and SMB is an acronym for "Small and Medium Business." Therefore, "home network" includes networks that reside in one or more homes or businesses.

An "SP-facing router" is coupled to a SP router and no other router is logically between the SP facing router and the SP router. Thus, an SP-facing router connects a home network to a SP network and forwards IPv6 packets not explicitly addressed to the SP-facing router. An SP-facing router is also referred to as an "edge-facing router."

The term "DHCP" refers to DHCPv6 unless specifically stated otherwise.

Embodiments are described herein according to the following outline:
OVERVIEW
1.0 "Flat" Prefix Sub-Delegation
2.0 Identifying An SP-Facing Router
   2.1 Reserved Bit in Router Advertisement
   2.2 DHCPv6 Option
   2.3 Received Prefix Delegation
   2.4 Router Advertisement Option Includes Specified Prefix
3.0 Other Uses of Identifying an SP-Facing Router
4.0 Implementation Mechanisms—Hardware Overview
5.0 Extensions and Alternatives

OVERVIEW

In an embodiment, storage media store instructions which, when executed by one or more processors, cause obtaining data at a first router of a subscriber network; determining, based on the data, whether the first router is a service provider (SP)-facing router; in response to determining that the first router is an SP-facing router, storing, on the first router, identification data that identifies the first router as an SP-facing router; and in response to determining that the first router is not an SP-facing router, storing, on the first router, identification data that identifies the first router as a non-SP-facing router.

In an embodiment, storage media storing instructions which, when executed by one or more processors, cause obtaining a DHCP message at a first router of a subscriber network; in response to obtaining the DHCP message, identifying a prefix delegation indicated in the DHCP message; determining whether the prefix delegation is for less than 64 bits; in response to determining that the prefix delegation is for less than 64 bits, storing, on the first router, identification data that identifies the first router as a service provider (SP)-facing router; and in response to determining that the prefix delegation is for 64 bits, storing, on the first router, identification data that identifies the first router as a non-SP-facing router.

Embodiments may be implemented in data packet routers, such as CPE routers and other networking infrastructure elements.

1.0 "Flat" Prefix Sub-Delegation

FIG. 1 depicts an example of a home network that illustrates in part the lack of conservation of address space occurring with hierarchical sub-delegation. Home network 100 comprises Customer Premises Equipment (CPE) Router 102, Office Routers 104, 106, Home Router 108, and Other Router 110. CPE Router 102 is an SP-facing router and is connected to ISP 120. In this example, ISP 120 delegates a /60 prefix to CPE Router 102. In response, CPE Router 102 determines which prefixes to sub-delegate to immediately adjacent downstream routers, comprising Office Routers 104, 106 and Home Router 108. CPE Router 102 determines that the number of LAN subnets is three. The power of two that is greater than, but nearest to, the number three is four, which corresponds to two bits. Therefore, CPE Router 102 sub-delegates three different /62 prefixes to each LAN subnet, i.e., one to each of Office Routers 104, 106 and Home Router 108. For example, Office Routers 104, 106 and Home Router 108 each have the same /60 prefix, but a different set of two remaining bits 61, 62. Bits 61, 62 that are delegated to Office Router 104 may be '00'; bits 61, 62 that are delegated to Office Router 106 may be '01'; and bits 61, 62 that are delegated to Home Router 108 may be '10'.

Based on this scenario, the bit value '11' (i.e., corresponding to bits 61, 62) is wasted because it is not delegated to any router. Further, if ISP 120 only delegates a /64 prefix to CPE Router 102, then CPE Router 102 will only be able to provide for one network. All other routers in home network 100 will not be able to obtain addresses for the purposes of SLAAC.

One approach for overcoming the problem of wasted address space is for a single SP-facing router, through DHCPv6 prefix delegation, to sub-delegate prefixes to all subnets in a home network. This approach is referred to herein as "flat prefix sub-delegation." Using a single SP-facing delegating router, downstream routers request /64 addresses for each routed subnet. The SP-facing delegating router runs a DHCPv6 server while all other routers in the home network run a DHCPv6 relay. Therefore, each router is required to determine whether it is an SP-facing router or a non-SP-facing router.

Once the prefixes are sub-delegated to all of the routers in the home network, each sub-delegated prefix is injected into the corresponding home router's routing table and advertised to the other home routers through an Interior Gateway Protocol (IGP), such as Routing Information Protocol next generation (RIPng) or Open Shortest Path First (OSPF).

Flat prefix sub-delegation conserves address space because the single SP-facing router can sub-delegate the entire address space using, for example, a sequential prefix numbering scheme. Such an approach also supports arbitrary graph networks because multi-homed networks can be concurrently-numbered and cyclic networks that are not multi-homed only use a single SP-facing delegating router.

In an embodiment, CPE router 102 may comprise the logic shown in expanded form in the lower right portion of FIG. 1. In an embodiment, CPE router 102 hosts an operating system 132 that hosts, manages or supervises other applications comprising detection logic 134, and optionally one or more of neighbor discovery protocol (NDP) logic 140, multicast listener discovery (MLD) proxy logic 142, firewall logic 144, and DHCP logic 138. The detection logic 134 is configured to implement the processes that are further described with reference to FIG. 3, FIG. 4, and FIG. 5A, FIG. 5B. The detection logic 134 may set a value of an SP-facing router flag 136 based on whether the detection logic detects that the router 102 is an SP-facing router, using the techniques further described herein. The neighbor discovery protocol (NDP) logic 140 implements NDP. The multicast listener discovery (MLD) proxy (RFC 4605) logic 142 implements multicast listening as further described herein. The firewall logic 144 implements router firewall functions for selectively admitting or blocking inbound and/or outbound packets. The DHCP logic 138 implements either DHCPv6 server or DHCPv6 relay agent functions based on stored configuration or based on instructions received from the detection logic 134, as further described.

In various embodiments one or more of the detection logic 134, neighbor discovery protocol (NDP) logic 140, multicast listener discovery (MLD) proxy logic 142, firewall logic 144, and DHCP logic 138 may be implemented using digital electronic devices such as one or more application-specific integrated circuits (ASICs) or field programmable gate arrays (FPGAs) that are persistently programmed, or may include one or more general purpose hardware processors programmed pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques described herein.

Figure 2:
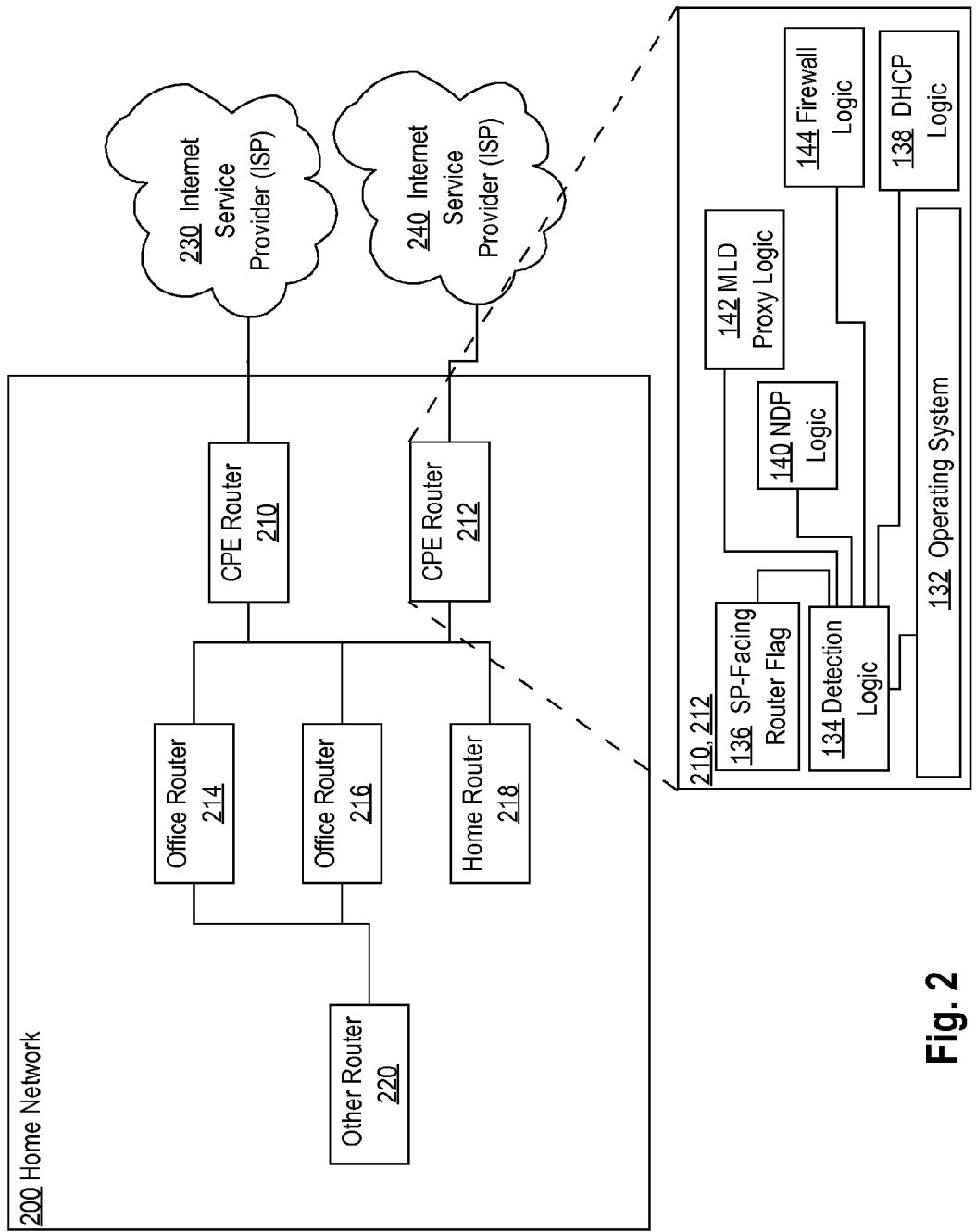
FIG. 2 depicts an example home network that is connected to two different ISPs.

FIG. 2 depicts an example home network to illustrate prefix sub-delegation when only an SP-facing router is a DHCPv6 server and all other routers in the same network are DHCPv6 relays. Home network 200 is connected to ISPs 230, 240 and comprises CPE Routers 210, 212, Office Routers 214, 216, Home Router 218, and Other Router 220. CPE Routers 210, 212 are SP-facing routers that are, respectively, communicatively connected to ISPs 230, 240. Each of CPE Routers 210, 212 implement DHCPv6 server functionality while the other routers in home network 200 each implement DHCPv6 relay functionality.

After Other Router 220 is added to home network 200, Other Router 220 multicasts a DHCPv6 SOLICIT message to Office Routers 214, 216. Office Router 214 relays the SOLICIT message it received to the same router that Office Router 214 received its addresses from, which are CPE Routers 210, 212. Similarly, Office Router 216 relays the SOLICIT message it received to CPE Routers 210, 212. Thus, both CPE Routers 210, 212 receive two SOLICIT messages.

CPE Router 210 responds to the two SOLICIT messages with two DHCPv6 ADVERTISE messages with the same /64 prefix. An ADVERTISE message is sent to each of Office Routers 214, 216 because both SOLICIT messages carried the same DHCPv6 Unique ID (DUID) from Other Router 220. A DUID is an identifier that uniquely identifies a DHCPv6 client.

Similarly, CPE Router 212 responds to the two SOLICIT messages with two ADVERTISE messages with the same /64 prefix, using a prefix value that is different than the prefix from CPE Router 210. An ADVERTISE message is sent to each of Office Routers 214, 216 because both SOLICIT messages carried the same DUID from Other Router 220. The two different /64 prefixes (which are carried in the ADVERTISE messages from CPE Routers 210, 212) are relayed back to Other Router 220, which configures two /64 prefixes on each of its interfaces, one for each ISP.

In general, if there are N SP-facing routers in a subscriber network, as is the case in home network 200, then N /64 prefixes are assigned to each non-SP facing router. Source address selection is then used on hosts to determine the SP with which to communicate. In general, source address selection may be governed by an application, such as MSR as described in RFC 4191. Therefore, an application may decide which SP is the best SP with which to communicate. Subsequently, each host receives an address for use with each SP. In this way, the above "flat" prefix delegation approach is usable in arbitrary graph networks, such as home network 200.

However, if a router fails to identify itself properly as an SP-facing or a non-SP-facing router, then that router will either invoke a DHCPv6 server operation when the router is not SP-facing, or invoke a DHCPv6 relay operation when the router is SP-facing. If a router is not SP-facing and acts as a DHCPv6 server, then the router will only receive a /64 prefix and will not be able to delegate multiple /64 prefixes to other routers in the home network.

If a router is SP-facing and invokes a DHCPv6 relay operation, then the router will forward every prefix delegation request that the router receives to the SP directly. Such a scenario would result in bloating DHCP tables of the SP with /64 prefix requests. The SP may not be set up to handle many /64 prefix requests. Further, the /64 prefix requests has the undesirable effect of exposing the topology of the home network to the SP.

One type of home router is a router that is embedded with a broadband modem. All embedded home routers are SP-facing and only support a DHCPv6 server. However, stand-alone home routers should support both DHCPv6 server and relay capabilities. A given stand-alone home router will invoke either DHCPv6 server functionality or relay functionality but not both. Thus, correct detection of whether a router is SP-facing is important for efficient prefix sub-delegation in a home network.

2.0 Identifying a Router as SP-Facing

Multiple techniques are provided herein for a router in a home network to determine whether the router is SP-facing. Embodiments are not limited to any particular technique. In one embodiment, a router includes digital computer logic implementing one or more functions for determining whether the router is SP-facing. The router receives data. In response to a router determining, through its digital computer logic, and based on the received data, that the router is SP-facing, the router stores identification data that identifies the router as SP-facing; for example, the router changes a particular bit, or other value in the router's memory, that indicates that the router is SP-facing.

Other digital computer logic may be executed conditionally in response, depending on whether the particular bit or other value indicates that the router is SP-facing. The correct determination of the SP-facing router in a home network is useful for efficiently and automatically sub-delegating prefixes. Further, the determination can be used for other purposes, such as determining which router in a home network should have a firewall enabled. Such purposes are described in more detail below.

2.1 Reserved Bit in Router Advertisement

Neighbor Discovery Protocol (NDP, described in RFC 4861) is used by IPv6. NDP operates in the Link Layer and is responsible for discovery of other nodes on a link, determining the link layer addresses of other nodes, finding available routers, and maintaining reachability information about the paths to other active neighbor nodes. NDP defines five different message types, one of which is a Router Advertisement (RA).

An NDP packet of type RA is a control message that is sent from an IPv6 router to downstream nodes. The RA message is a multicast message that all clients, including hosts and routers, on a router's local IPv6 subnet will receive and process. Routers that support IPv6 send out an RA message. Hosts that are on the same link as an IPv6 router read any prefixes that are advertised in an RA message and configure addresses based on the MAC address of the host's interface using the EUI-64 format. Thus, hosts are not required to use a DHCP server to configure their respective addresses. The format of an RA message comprises a reserved field of 6 bits.

Figure 3:
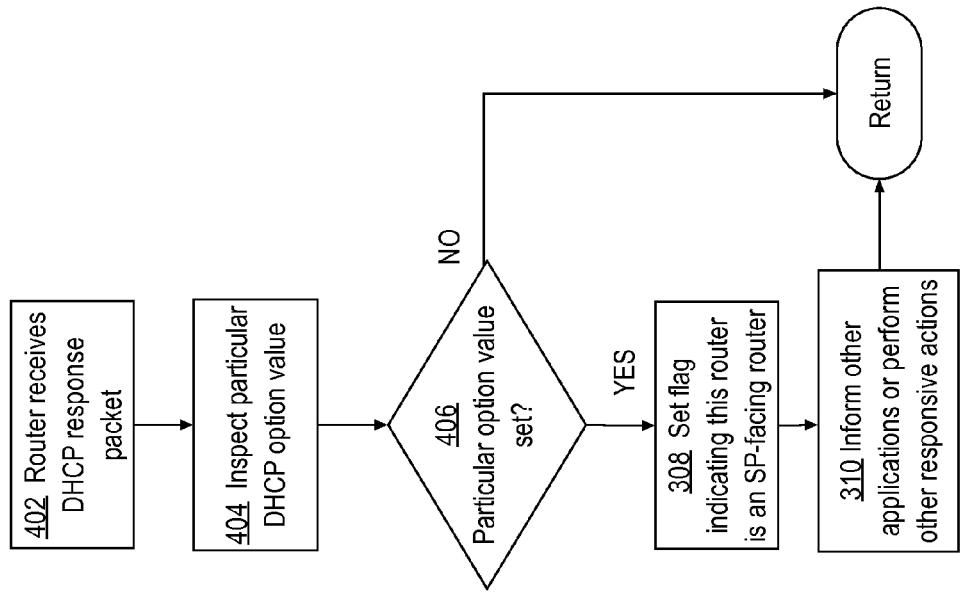
FIG. 3 depicts a process of determining whether a router is an SP-facing router.

FIG. 3 depicts a process of determining whether a router is an SP-facing router. In operation 302, a router receives an NDP RA packet. In an embodiment, detection logic 134 receives a copy of an NDP RA packet from NDP logic 140, or the functions of FIG. 3 may be integrated into the NDP logic. The NDP RA packet is an example of data received at a router that may be used to determine whether the router is SP-facing.

In operation 304, a particular bit of the reserved field of the RA packet is inspected. In an embodiment, a particular bit in the reserved field of an RA message, when set to '1', indicates that the RA message originates from an SP router in an SP network. Conversely, the same particular bit, when set to '0', indicates that the RA message does not originate from an SP router. Thus, in an embodiment an SP edge router sets the particular bit to '1' while the SP-facing router in a home network clears the particular bit (which is the default setting for reserved bits).

If a router in a home network receives an RA message and determines the current value of the particular bit, then the router can determine whether it is an SP-facing router. Thus, in operation 306, a test is performed to determine whether the particular bit in the reserved field is set. If the particular bit is set, then in operation 308, the process stores identification data that identifies the router as an SP-facing router. For example, the process sets a flag indicating that the router is an SP-facing router. For example, detection logic 134 sets SP-Facing router flag 136.

In operation 310, the process informs one or more other applications about the status of the flag or the router's identity as an SP-facing router, or performs other responsive actions. Examples of responsive actions are provided elsewhere herein, such as in section 3.

In an embodiment, when an SP-facing router sends any RA message to other routers in the home network as part of operation of the NDP protocol to announce itself to downstream nodes, the SP-facing router clears the particular bit. Thus, routers downstream from the SP-facing router can determine, from the value of the particular bit, that they are not SP-facing routers.

In an embodiment, SP edge routers, such as a Cable Modem Termination Router (CMTS) or Digital Subscriber Line Access Multiplexer (DSLAM or a router upstream of the DSLAM), are configured to support the particular reserved bit.

In an embodiment, the particular bit, when set to '0' in an RA message, indicates that a router in a home network is an SP-facing router, whereas a value of '1' indicates that a router in a home network is not SP-facing. When a router receives an RA message with the particular bit set to '0', the router can determine that the router is an SP-facing router. The SP-facing router will then set, in RA messages sent to downstream routers, the particular bit to '1'. In this embodiment, no change to SP routers in an SP network is required. The SP-edge routers are not reconfigured to support the particular bit because the default operation of SP-edge routers is to leave the bits in the reserved field at '0'.

2.2 Use of Particular DHCPV6 Option to Indicate SP-Facing Routers

The Dynamic Host Configuration Protocol for IPv6 (DHCPv6, described in RFC 3315) enables DHCP servers to pass configuration parameters such as IPv6 network addresses to IPv6 nodes. DHCPv6 offers the capability of automatic allocation of reusable network addresses and additional configuration flexibility. DHCPv6 is an alternative means to SLAAC for address acquisition in IPv6, and can be used separately or concurrently with SLAAC to obtain configuration parameters.

Figure 4:
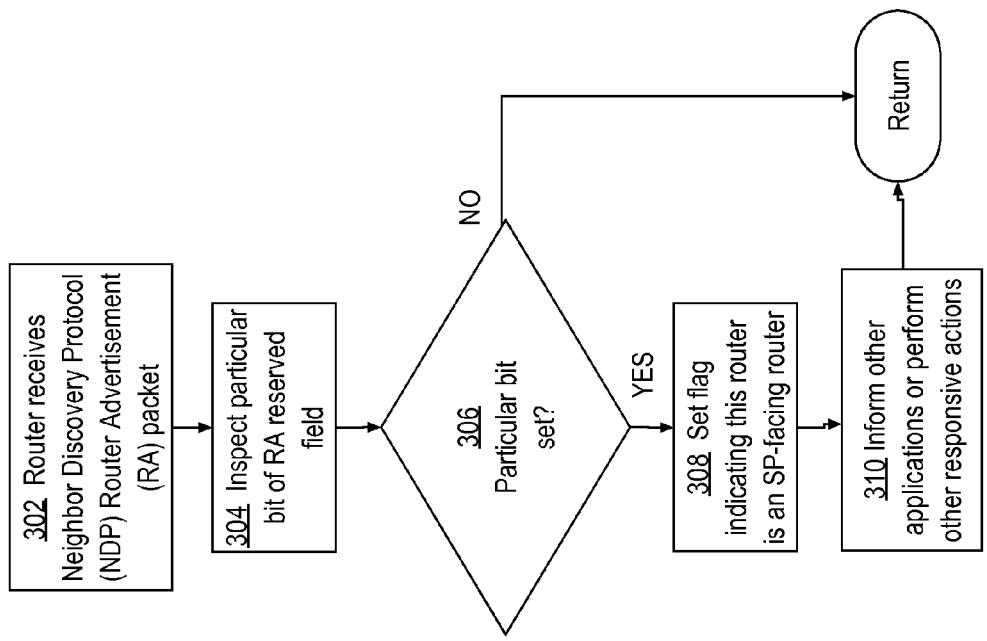
FIG. 4 depicts a process of determining whether a router is an SP-facing router.

FIG. 4 depicts a process of determining whether a router is an SP-facing router. In operation 402, a router receives a DHCP response packet. The DHCP response packet is an example of data received at a router that may be used to determine whether the router is SP-facing.

In an embodiment, detection logic 134 receives a copy of a DHCP response packet from DHCP logic 138, or the functions of FIG. 4 may be integrated into the DHCP logic. At operation 404, a particular DHCP option value in the response packet is inspected. In an embodiment, a particular DHCPv6 option value, which may be denoted in one example embodiment as "OPTION_SP", is communicated in various DHCPv6 response messages, as ADVERTISE and REPLY messages. In an embodiment, a DHCPv6 server in an SP network sets the particular option value to '1' in DHCPv6 response messages that are sent to clients. Only the home router that is connected to the SP edge router sends DHCPv6 requests that reach the SP-located DHCPv6 server. Thus, when the SP-located DHCPv6 server responds to a home router with OPTION_SP, the home router can determine that it is a SP-facing router.

Thus, in operation 406, the process tests whether the particular DHCP option value is set. If the particular option value is set, then in operation 408, the process stores identification data that identifies the router as an SP-facing router. For example, the process sets a flag indicating that the router is an SP-facing router. For example, detection logic 134 sets SP-facing router flag 136. In operation 410, the process informs one or more other applications about the status of the flag or the router's identity as an SP-facing router, or performs other responsive actions. Examples of responsive actions are provided elsewhere herein, such as in section 3.

When the DHCPv6 server in the SP-facing router responds to DHCPv6 requests from non-SP-facing routers, the DHCPv6 server on the SP-facing router responds with messages that include the OPTION_SP set to '0'. Thus, routers that receive a DHCPv6 response message with OPTION_SP set to '0' can determine that they are not SP-facing.

In an alternative embodiment, an OPTION_SP of '0' indicates that a router is SP-facing while an OPTION_SP of '1' indicates that a router is not SP-facing.

2.3 Identifying the Received Prefix Delegation

An SP router is configured with a set of prefixes to be used for assignment to customers at the time of each subscriber's first connection to the SP network. The prefix delegation process begins when the SP-facing router requests prefix delegation information through DHCPv6. DHCPv6 messages from the SP-facing router are received by the SP delegating router. When the SP router receives the request, the SP router selects an available prefix or prefixes for delegation to the SP-facing requesting router. The SP router then returns the prefix or prefixes to the SP-facing router.

Acquiring a prefix is equivalent to a home router sending a DHCPv6 IA_PD option in a DHCPv6 request to a DHCPv6 server executing on an SP router. The DHCPv6 server populates the IA_PD option with a prefix and sends a reply to the home router. The home router uses the prefix to provide other addresses to other downstream clients. If a router located behind the SP-facing router sends a request for IA_PD before the SP-facing router has acquired the IA_PD, then the SP-facing router drops the IA_PD request from the router that is downstream of it; the downstream router retries as provided in RFC 3315.

FIG. 5A depicts a process of determining whether a router is an SP-facing router. In operation 502, in an embodiment, a prefix requesting router such as CPE router 102, 210, 212 receives a DHCPv6 response message from a prefix delegating router, such as an SP router in the ISPs 120, 230, 240. The DHCPv6 response message is an example of data received at a router that may be used to determine whether the router is SP-facing.

In operation 504 the requesting router analyzes the message to determine whether the delegated prefix is less than 64 bits, such as a /56 prefix or a /61 prefix. If a requesting router is delegated a prefix less than 64 bits, as tested in operation 506, then the requesting router determines that it is an SP-facing router. In an embodiment, as shown in operation 308, the process stores identification data that identifies the router as an SP-facing router. For example, the requesting router sets a flag indicating that the router is an SP-facing router; for example, detection logic 134 sets SP-facing router flag 136. If a requesting router is delegated a prefix of 64 bits, then the requesting router determines that it is not an SP-facing router, as indicated by the NO path from operation 506 in FIG. 5A. At operation 310, the router may inform other applications or perform other responsive actions, as further described above and in section 3.

An SP-facing router may then sub-delegate one or more /64 prefixes to other routers in the home network. For example, CPE router 212 may sub-delegate prefixes to routers 214, 216, 218, 220. Therefore, if a requesting router receives a prefix shorter than /64 in the IA_PD option field of a DHCPv6 response message, then the requesting router can determine that it is an SP-facing router.

It is possible that an SP-facing router receives a /64 prefix from the SP. However, such a prefix does not allow for further prefix sub-delegation.

2.4 Router Advertisement Option

In an embodiment, a particular RA message option value signals whether a router is SP-facing, and the reserved bit approach is not necessary. Using a particular RA message option value may be useful if the reserved field of 6 bits is fully committed to other purposes.

FIG. 5B depicts a process of determining whether a router is an SP-facing router when an option value includes a delegated prefix. In operation 512, a router receives an NDP RA packet. In operation 514, a particular RA option field value in the NDP RA packet is inspected and a delegated prefix value is inspected.

If a requesting router is delegated a prefix less than 64 bits, as tested in operation 516, then the requesting router determines that it is an SP-facing router. In an embodiment, as shown in operation 308, the process stores identification data that identifies the router as an SP-facing router. For example, the requesting router sets a flag indicating that the router is an SP-facing router; for example, detection logic 134 sets SP-facing router flag 136. If a requesting router is delegated a prefix of 64 bits, then the requesting router determines that it is not an SP-facing router, as indicated by the NO path from operation 516 in FIG. 5B. At operation 510, the router may sub-delegate prefixes, inform other applications or perform other responsive actions, as further described above and in section 3.

3.0 Other Uses of Identifying an SP-Facing Router

As noted above, SP-facing identification is useful for sub-delegating IPv6 prefixes in an arbitrary graphed network without wasting address space and assuring that /64 prefixes are available to all devices in the home network (as long as the initial prefix delegated by the SP is small enough to support all the subnets in the home network). Additional benefits are available from a router determining whether it is a SP-facing.

In an embodiment, if a home router determines that it is SP-facing, then the home router also functions as a firewall. Thus, for example, responsive actions in operation 310 of FIG. 3, FIG. 4, FIG. 5A, FIG. 5B may include enabling firewall logic 144 or other firewall functions of the CPE router that has determined that it is SP-facing.

It is preferable to enable a firewall only on an SP-facing router of a home network. Thus, if an incoming connection is received at a home router, then the home router blocks or allows the connection depending on whether the home router is SP-facing. If the home router is SP-facing, then the home router blocks the connection. If the home router is not SP-facing, then the home router does not block the connection.

In another embodiment, if a home router determines that it is SP-facing, then the home router enables MLD proxy logic 142 to enable operation as a Multicast Listener Discovery (MLD) Proxy (described in RFC 4605). Multicast traffic is processed depending on whether a home router is SP-facing. Many home routers support MLD Proxy, but only an SP-facing router should enable MLD Proxy. An SP-facing router, thus, may proxy all multicast data and control for the home network. Enabling MLD proxy at an SP-facing router enables the SP-facing router to issue MLD host messages on behalf of hosts that the router discovered through standard MLD interfaces.

In another embodiment, DHCP logic 138 is informed and the DHCP logic enables either DHCP relay agent functions or DHCP server functions. For example, if operations 306, 406, 506 are positive then in operations 310, 510 detection logic 134 or DHCP logic 138 cause enabling the DHCP logic to operate as a DHCP server. If the operations 306, 406, 506 are negative then in operations 310, 510 the detection logic 134 or DHCP logic 138 cause enabling the DHCP logic to operate as a DHCP relay agent.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
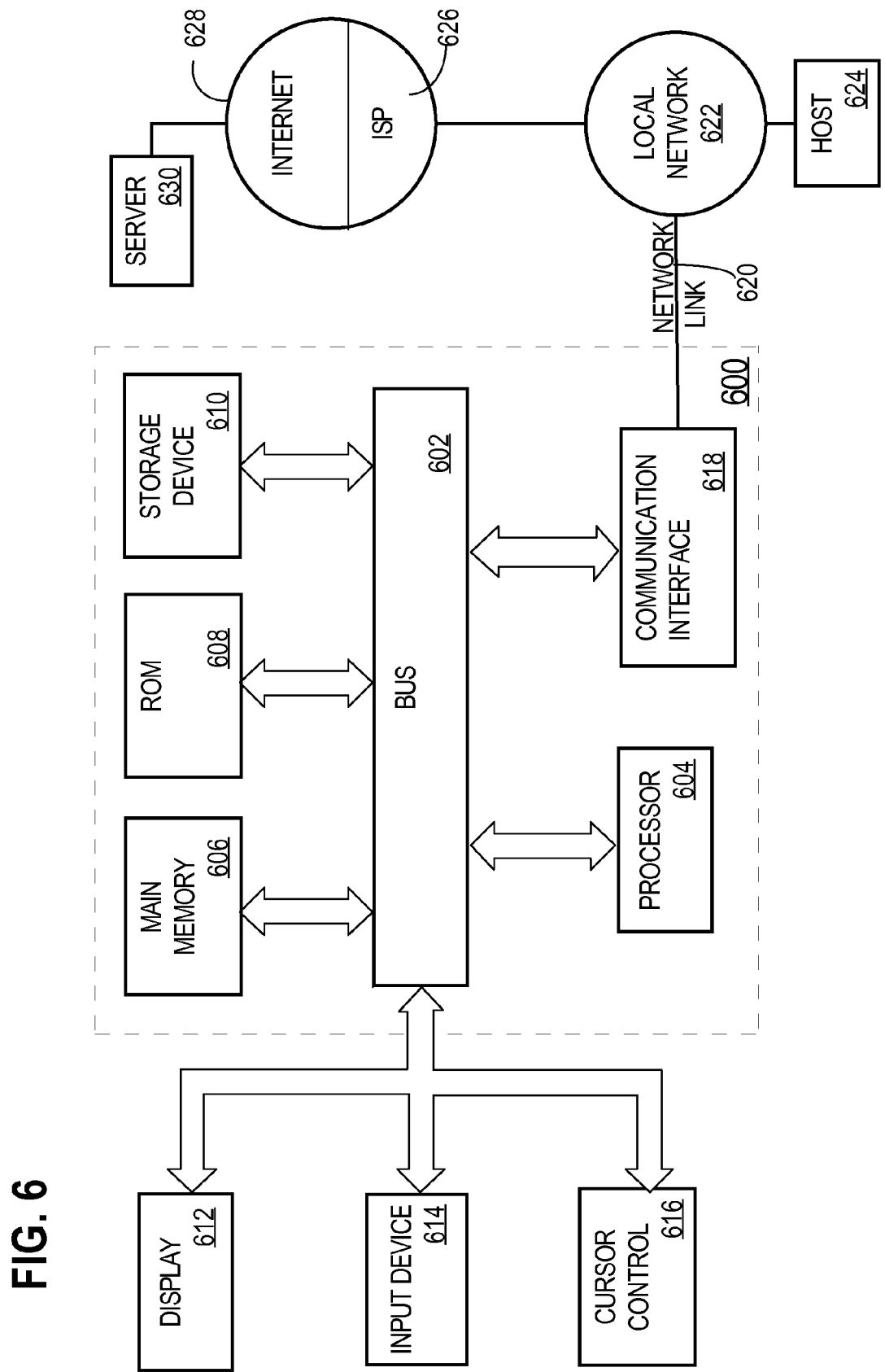
FIG. 6 depicts a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. One or more machine-readable storage media storing instructions which instructions when executed by one or more processors, cause:
    obtaining data at a first router of a subscriber network;
    after obtaining the data, determining, at the first router of the subscriber network, based on the data, whether the first router is a service provider (SP)-facing router, wherein a SP-facing router is a router that is coupled to a SP router and no other router in the subscriber network is logically between the SP-facing router and the SP router;
    if it is determined that the first router is an SP-facing router, then storing, at the first router of the subscriber network, identification data that identifies the first router as an SP-facing router in the subscriber network;
    if it is determined that the first router is not an SP-facing router, then storing, at the first router of the subscriber network, identification data that identifies the first router as a non-SP-facing router in the subscriber network.

2. The one or more storage media of claim 1, wherein obtaining data at the first router includes obtaining a DHCP message that includes the data; wherein the data indicates a prefix delegation; wherein determining whether the first router is an SP-facing router includes determining whether the prefix delegation is less than 64 bits; wherein storing the identification data includes storing the identification data that identifies the first router as an SP-facing router if the prefix delegation is less than 64 bits.

3. The one or more storage media of claim 1, wherein obtaining data at the first router includes obtaining a Network Discovery Protocol (NDP) Router Advertisement (RA) message that includes the data; wherein the data is located in a particular portion of the NDP RA message; wherein determining whether the first router is an SP-facing router includes analyzing the particular portion of the NDP RA message to determine whether the data at the particular portion indicates that the router is SP-facing.

4. The one or more storage media of claim 3, wherein the particular portion of the NDP RA message is an options field of the NDP RA message or a particular bit in a reserved field of the NDP RA message.

5. The one or more storage media of claim 1, wherein obtaining data at the first router includes obtaining a DHCP message that includes the data; wherein the data is located in an options field of the DHCP message; wherein determining whether the first router is an SP-facing router includes analyzing the options field of the DHCP message to determine whether the data in the options field indicates that the router is SP-facing.

6. The one or more storage media of claim 1, wherein the instructions, when executed by the one or more processors, further cause, after determining that the first router is an SP-facing router, delegating 64-bit prefixes to each other router in the subscriber network.

7. The one or more storage media of claim 1, wherein the instructions, when executed by the one or more processors, further cause, in response to determining that the first router is an SP-facing router, causing the first router to function as a firewall to prevent unauthorized messages from being forwarded to one or more hosts in the subscriber network.

8. The one or more storage media of claim 1, wherein the instructions, when executed by the one or more processors, further cause, in response to determining that the first router is an SP-facing router, causing the first router to function as a multicast proxy.

9. A data packet router comprising:
one or more processors;
one or more storage media coupled to the one or more processors and storing instructions which instructions when executed by the one or more processors, cause:
obtaining data;
after obtaining the data, determining, at the data packet router, based on the data, whether the data packet router is a service provider (SP)-facing router, wherein an SP-facing router is a router that is coupled to a SP router and no other router in a subscriber network is logically between the SP-facing router and the SP router;
if it is determined that the data packet router is an SP-facing router, then storing, at the data router in the subscriber network, identification data that identifies the data packet router as an SP-facing router in the subscriber network;
if it is determined that the data packet router is not an SP-facing router, then storing at the data router in the subscriber, identification data that identifies the data packet router as a non-SP-facing router in the subscriber network.

10. The data packet router of claim 9, wherein the instructions that cause obtaining data at the data packet router include instructions that cause obtaining a DHCP message that includes the data; wherein the data indicates a prefix delegation; wherein the instructions that cause determining whether the data packet router is an SP-facing router include instructions that cause determining whether the prefix delegation is less than 64 bits; wherein the instructions that cause storing the identification data include instructions that cause storing the identification data that identifies the data packet router as an SP-facing router if the prefix delegation is less than 64 bits.

11. The data packet router of claim 9, wherein the instructions that cause obtaining data at the data packet router include instructions that cause obtaining a Network Discovery Protocol (NDP) Router Advertisement (RA) message that includes the data; wherein the data is located in a particular portion of the NDP RA message; wherein the instructions that cause determining whether the data packet router is an SP-facing router include instructions that cause analyzing the particular portion of the NDP RA message to determine whether the data at the particular portion indicates that the router is SP-facing.

12. The data packet router of claim 11, wherein the particular portion of the NDP RA message is an options field of the NDP RA message or a particular bit in a reserved field of the NDP RA message.

13. The data packet router of claim 9, wherein the instructions that cause obtaining data at the data packet router include instructions that cause obtaining a DHCP message that includes the data; wherein the data is located in an options field of the DHCP message; wherein the instructions that cause determining whether the data packet router is an SP-facing router include instructions that cause analyzing the options field of the DHCP message to determine whether the data in the options field indicates that the router is SP-facing.

14. The data packet router of claim 9, wherein the instructions, when executed by the one or more processors, further cause, after determining that the data packet router is an SP-facing router, delegating 64-bit prefixes to each other router in the subscriber network.

15. The data packet router of claim 9, wherein the instructions, when executed by the one or more processors, further cause, in response to determining that the data packet router is an SP-facing router, causing the data packet router to function as a firewall to prevent unauthorized messages from being forwarded to one or more hosts in the subscriber network.

16. The data packet router of claim 9, wherein the instructions, when executed by the one or more processors, further cause, in response to determining that the data packet router is an SP-facing router, causing the data packet router to function as a multicast proxy.

17. The data packet router of claim 9, comprising customer premises equipment (CPE) configured to couple to a home network.

18. A method comprising:
obtaining data at a first router of a subscriber network;
after obtaining the data, determining, at the first router of the subscriber network, based on the data, whether the first router is a service provider (SP)-facing router, wherein an SP-facing router is a router that is coupled to a SP router and no other router in the subscriber network is logically between the SP-facing router and the SP router;
if it is determined that the first router is an SP-facing router, then storing, at the first router of the subscriber network, identification data that identifies the first router as an SP-facing router in the subscriber network;
if it is determined that the first router is not an SP-facing router, then storing, at the first router of the subscriber network, identification data that identifies the first router as a non-SP-facing router in the subscriber network;
wherein the method is performed by one or more computers.

19. The method of claim 18, wherein obtaining data at the first router includes obtaining a DHCP message that includes the data; wherein the data indicates a prefix delegation; wherein determining whether the first router is an SP-facing router includes determining whether the prefix delegation is less than 64 bits; wherein storing the identification data includes storing the identification data that identifies the first router as an SP-facing router if the prefix delegation is less than 64 bits.

20. The method of claim 18, wherein obtaining data at the first router includes obtaining a Network Discovery Protocol (NDP) Router Advertisement (RA) message that includes the data; wherein the data is located in a particular portion of the NDP RA message; wherein determining whether the first router is an SP-facing router includes analyzing the particular portion of the NDP RA message to determine whether the data at the particular portion indicates that the router is SP-facing.

21. The method of claim 20, wherein the particular portion of the NDP RA message is an options field of the NDP RA message or a particular bit in a reserved field of the NDP RA message.

22. The method of claim 18, wherein obtaining data at the first router includes obtaining a DHCP message that includes the data; wherein the data is located in an options field of the DHCP message; wherein determining whether the first router is an SP-facing router includes analyzing the options field of the DHCP message to determine whether the data in the options field indicates that the router is SP-facing.

23. The method of claim 18, wherein the instructions, when executed by the one or more processors, further cause, after determining that the first router is an SP-facing router, delegating 64-bit prefixes to each other router in the subscriber network.

24. The method of claim 18, wherein the instructions, when executed by the one or more processors, further cause, in response to determining that the first router is an SP-facing router, causing the first router to function as a firewall to prevent unauthorized messages from being forwarded to one or more hosts in the subscriber network.

25. The method of claim 18, wherein the instructions, when executed by the one or more processors, further cause, in response to determining that the first router is an SP-facing router, causing the first router to function as a multicast proxy.

* * * * *